United States Patent [19]
Koike et al.

[11] Patent Number: 6,059,556
[45] Date of Patent: May 9, 2000

[54] INJECTION APPARATUS FOR INJECTION MOLDING MACHINE

[75] Inventors: Jun Koike; Masahiro Tamaki, both of Shizuoka-ken, Japan

[73] Assignee: Toshiba Kikai Kabushiki Kaisha, Tokyo-To, Japan

[21] Appl. No.: 09/116,585

[22] Filed: Jul. 16, 1998

[30] Foreign Application Priority Data

Jul. 16, 1997 [JP] Japan .................................. 9-207107

[51] Int. Cl.$^7$ ................................................ B29C 45/54
[52] U.S. Cl. ........................................ 425/145; 425/574
[58] Field of Search ..................................... 425/145, 574

[56] References Cited

U.S. PATENT DOCUMENTS 5,540,495  7/1996  Pickel ...................................... 425/145
5,645,868  7/1997  Reinhart .................................. 425/145

*Primary Examiner*—Tim Heitbrink
*Attorney, Agent, or Firm*—Pillsbury Madison & Sutro LLP

[57] ABSTRACT

An injection apparatus of an injection molding machine, for easy control of the charging motor and the injection motor and highly precise control of the back pressure of a screw thereby enabling performance of the proper charging operation, has an injection motor with a rotor adapted to act as a ball screw nut and which is secured to an injection carriage having mounted thereon a heating barrel of the injection apparatus. The injection motor has a shaft forming a ball screw in one end portion of the shaft connected to a screw of the injection molding machine. The ball screw is screwed into the rotor of the injection motor. The other end of the shaft forms a spline portion, and is connected to a charging motor that has a hollow drive shaft whose inside-diameter portion is spline-fitted onto the spline portion of the shaft.

4 Claims, 2 Drawing Sheets

INJECTION APPARATUS FOR INJECTION MOLDING MACHINE

BACKGROUND OF THE INVENTION

1. Field of the Invention

The present invention relates to an injection apparatus for a motor-driven injection molding machine. In particular, it relates to an improvement that facilitates the control of back pressure during charging a process.

2. Description of the Related Art

FIG. 4 shows an injection apparatus of a conventional motor-driven injection molding machine. The reference numeral 1 denotes an injection apparatus. A barrel unit 3 fed with plastic material is mounted on an injection carriage 2. The barrel unit 3 includes a barrel having an internal elongated cylindrical bore. A screw 4 is rotatably and axially movably disposed in the bore of the barrel 3.

A ball screw 5 extends coaxially and integrally from a rear end portion of the screw 4. A spline shaft 6 is integrally connected to the rear end of the ball screw 5.

An injection motor 7 which is for use in the injection process and drives the ball screw 5 is installed in the injection carriage 2. A charging motor 8 which is for use in the charging process and drives the spline shaft 6 is as well installed in the injection carriage 2. A rotor 9 of the injection motor 7 is designed to act as a ball screw nut that engages with the ball screw 5. And a rotor 10 of the charging motor 8 is designed to act as a spline nut that is fitted onto the spline shaft 6. A numerical control unit 11 controls the operation of the injection motor 7 and charging motor 8 so that the screw 4 moves forwardly in the injection process, or rotates in the charging process.

During the charging process, the spline shaft 6 permits the transmission of the rotation of the charging motor 8 to the screw 4 integral with the spline shaft 6 and ball screw 5. The screw 4 rotates and plasticizes the material fed into the barrel 3. The melt material accumulates in front of the screw 4, forcing back the screw 4 rearwardly.

During the injection process, the combination of the ball screw 5 and ball nut 9 converts the rotation of the injection motor 7 to the liner motion which causes the screw 4 to move forwardly(the leftward direction in the figure), whereby the screw 4 injects the molten material accumulated in front of the screw 4 into a mold cavity. The numerical control unit 11 controls the injection motor 7 to rotate and controls the charging motor 8 to keep from rotating, so as to enable the screw 4 to move forwardly.

The movement of the screw 4 in the charging process consists of the rotation for plastication and the retreat motion caused by the pressurized molten material accumulated in front of the screw 4. The rotation of the screw 4 simultaneous with retreat is properly achieved, in conjunction with the injection motor 7 to control of the back pressure to be applied on the screw 4.

However, in this prior-art injection apparatus, the ball screw 5 is made integral with the spline shaft 6 and it is so arranged that the charging motor 8 rotates the spline nut 10 fitted onto the spline shaft 6. Therefore, while the charging motor 8 rotates the spline shaft 6 to cause the screw 4 to rotate, the ball screw 5 rotates inevitably. This inevitable rotation of the ball screw 5 brings the screw 4 to move rearwardly, regardless of the amount of the molten material forced forwardly by the rotating screw 4.

The prior-art injection apparatus provided with the charging motor 8 having such a structure that the spline shaft 6 passes through the rotor 10 involves following drawbacks to control the back pressure. The rotation of the rotor 10 prevents the spline shaft 6 from slipping axially through the rotor 10. That needs to apply a appropriate back pressure to the screw 4 to cause it to retreat at the velocity corresponding to the feed rate of the molten material. For that reason, it is difficult to control the charging motor 8 and injection motor 7 with the rotation of the former being synchronized with that of the latter. That fails in the precise control of the back pressure applied to the screw 4. As a result, The screw 4 is forced to retreat only by the pressure of the molten material.

SUMMARY OF THE INVENTION

An object of the present invention is to provide an injection apparatus for a motor-driven injection molding machine which enable to remove therefrom the above-described drawbacks that make it difficult to control the charging motor and injection motor synchronously, and to achieve the precise control of the back pressure applied to the screw.

To attain the above object, according to a first aspect of the present invention, an injection apparatus for an injection molding machine having a barrel unit and a motor driven screw disposed in the barrel unit rotatably and movably in the axial direction, said apparatus comprising an injection carriage for mounting the barrel unit thereon, an injection motor having a rotor provided with a ball screw nut integrally therewith and being secured to the injection bracket, a shaft member consisting of one half portion connected to the screw and having a ball screw engaging with the rotor of the injection motor, and the other end portion having a straight-sided spline shaft, a hollow drive shaft having a interior wall portion into which the spline shaft is fitted slidably so as to permit a retreat motion of the shaft member, a charging motor for driving the hollow drive shaft.

According to a second aspect of the present invention, there is provided an injection apparatus for an injection molding machine which comprises an injection carriage for mounting the barrel unit thereon and disposed mobably, an injection motor having a rotor provided with a ball screw nut integrally therewith and disposed movably in the axial direction of the screw, a first shaft member having one end portion connected to the screw and the other end portion having a straight-sided spline shaft, a second shaft member provided with a hollow shaft portion having a interior wall portion into which the spline shaft is fitted slidably so as to permit a retreat motion of the first shaft member, and a ball screw portion engaging with the rotor of the injection motor, a charging motor for driving the second shaft member and disposed on the base movably in the axial direction of the screw, guide means for guiding the injection carriage, injection motor and the charging motor to move in the axial direction of the screw.

As described above, according to the present invention, it is not necessary to perform difficult control based on the synchronization between the charging motor and the injection motor as in the prior apparatus and it is possible to control the charging motor and the injection motor, and to perform the proper charging operation by applying the appropriate back pressure to the screw with a high precision.

DETAILED DESCRIPTION OF THE PREFERRED EMBODIMENTS

Figure 1:
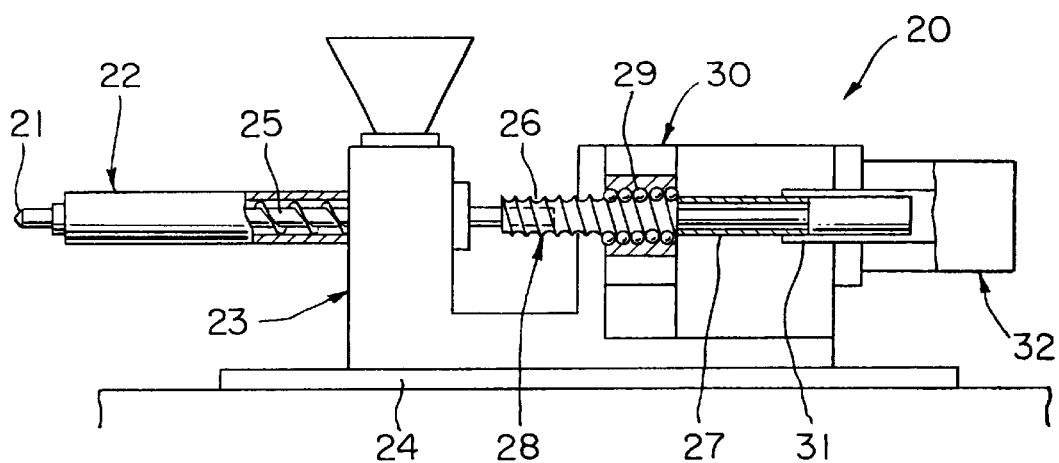
FIG. 1 is an front view of an injection apparatus for a motor-driven injection molding machine according to an embodiment of the present invention.

A first embodiment of the present invention will now be explained with reference to FIG. 1. The reference numeral 20 denotes an injection apparatus according to the first embodiment of the present invention. A barrel unit 22 includes a barrel provided with a nozzle 21 on a injection end. The barrel unit 22 is mounted on a injection carriage 23 which installed on a base 24 slidably toward the longitudinal direction. The barrel has a internal elongated cylindrical bore in which a screw 25 is disposed rotatably and is movable a prescribed distance in the axial direction. A shaft member 28 is connected to a rear end of the screw 26. The shaft member 28 integrally consists of ball screw 25 of one half portion and a spline shaft 27 of the other half portion. A injection motor 30 is provided with a rotor 29 which is adapted to act as a ball screw nut engaging with the ball screw 26. The injection motor 30 is mounted on the injection carriage 23.

The spline shaft 27 which is of straight-sided configuration is connected to a hollow drive shaft 31. The drive shaft 31 having driven by a charging motor 32 is provided with a interior wall on which the spline shaft 27 is fitted slidably. The charging motor 32 is mounted on the rear end of the injection carriage 23. The hollow drive shaft 31 permits the liner motion of the shaft member 28, i.e., the retreat motion of the screw 25 caused by the pressure of the molten plastic material accumulated in front of the screw 25.

The function and operation of the injection apparatus according to the present invention will be explained.

In the injection process, when supplying a current to the injection motor 30, the rotor 29 is actuated to rotate. The rotational power of the injection motor 30 is converted to a thrust force by the ball screw 26 and the thrust force is transmitted to the screw 25. Whereby, the screw 25 is forced to move forwardly to the left direction in the figure and can inject through the nozzle 21 the molten material accumulated in front of the screw 25 into a mold cavity(not shown).

In the charging process, The charging motor 32 is started, the charging motor 32 drives the hollow drive shaft 31, with the result that the rotation is transmitted to the shaft member 28 through the spline shaft 27 fitted thereto. It is noted that the injection motor 30 is not driven and the rotor 29 is kept free to rotate. Whereby, the screw 25 retreats accompanying with rotation, due to the pressure of the molten material that is accumulated and charged in front of the screw 25.

Figure 4:
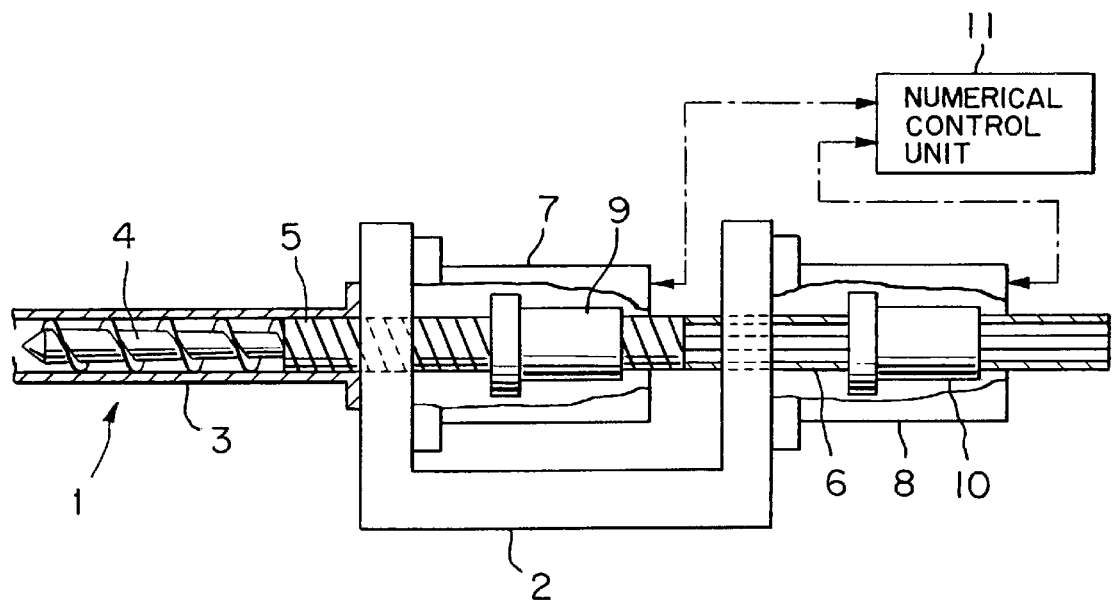
FIG. 4 is an illustration showing a conventional injection apparatus for a motor-driven injection molding machine.

According to the injection apparatus of the first embodiment, the spline shaft 27 is fitted slidably into the hollow shaft 31 so that the displacement of the shaft member 28 caused by the retreat motion of the screw 25 is absorbed into the slippage motion between the hollow drive shaft 31 and the spline shaft 27. Consequently, during the charging process, unlike the conventional injection apparatus as shown in FIG. 4 wherein the charging motor and the injection motor should be driven synchronously and thereby it is difficult to control the back pressure applied to the screw 25, the appropriate back pressure can be applied to the screw 25 by braking the molten material accumulated in front of the screw 25 with only the injection motor 20 alone being controlled.

Figure 2:
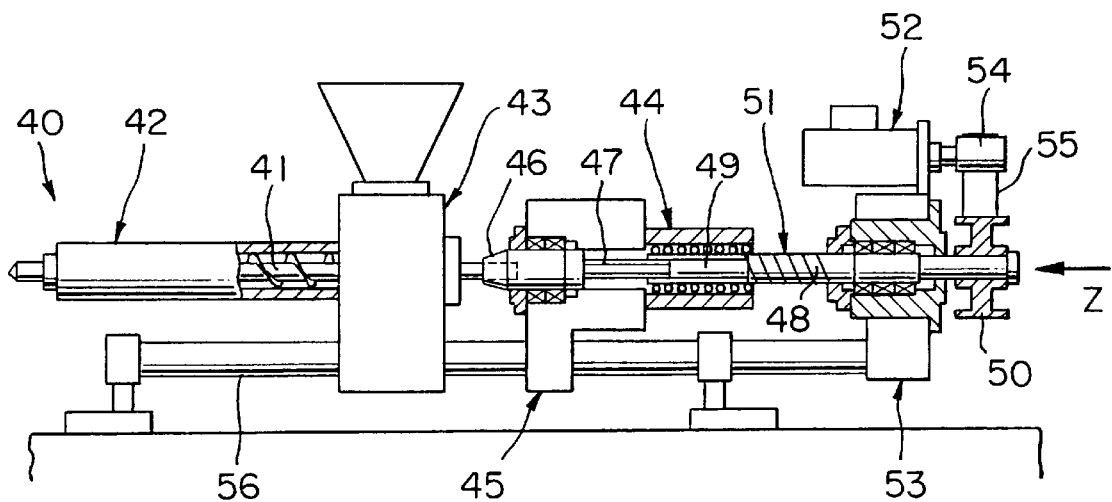
FIG. 2 is a front view of an injection apparatus for a motor-driven injection molding machine according to another embodiment of the present invention.
Figure 3:
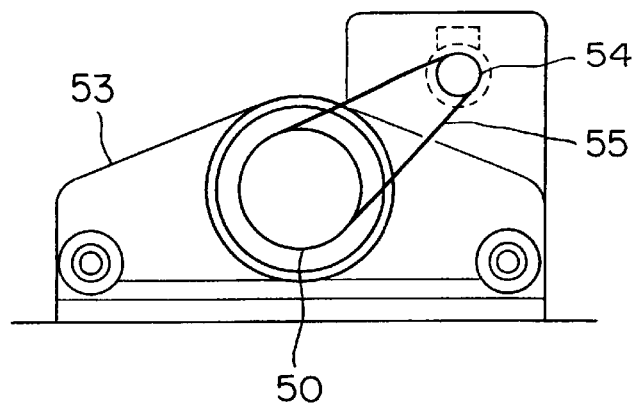
FIG. 3 is a view taken from a direction indicated by an arrow Z in FIG. 2, which is a side view of the injection apparatus for the motor-driven injection machine according to said another embodiment of the present invention.

Another embodiment of the present invention will be explained with reference to FIGS. 2 and 3. The reference numeral 40 denotes an injection apparatus according to the second embodiment of the present invention. A barrel unit 42 having internal elongated cylindrical bore in which a screw 41 rotatably and axially movably disposed is mounted on an injection carriage 43. The injection carriage is movable in the axial direction of the screw 41, being guided by a guide bar 56 fixed on the base. To a rear end portion of the screw 41 there is connected one end of a first shaft member 46. The first shaft member 46 is supported freely rotatably through a baring on an injection motor mounting member 45 which is movably disposed on the base. The injection motor mounting member 45 is guided by the guide bar 56 in the axial direction. The rear end portion of the first shaft member 46 is formed in the shape of a straight-sided spline shaft 47. A rotor of the injection motor 44 have a inner portion designed to act as a ball screw nut. The rotor of the injection motor 44 is connected to a second shaft member 51. A front half portion of the second shaft member 51 is provided with a ball screw 48 engaging with the ball screw nut portion of the rotor. And the front end portion of the second shaft member 51 has a hollow portion having a interior wall portion on which the spline shaft 47 of the first shaft member 46 is fitted slidably. The other end of the second shaft member 51 is freely rotatably sustained by a bearing on a charging motor mounting member 53. A charging motor 52 is mounted on the charging motor mounting member 53 which is disposed movably in the axial direction so as to be guided by the guide bar 56.

The charging motor 52 is provided with a first pulley for synchronous belt drive 54 in order to transmit the drive power therefrom to the second shaft member 51. A second pulley for synchronous belt drive 50 is attached to the second shaft member 51. A synchronous belt 55 connects the first pulley 54 and second pulley 50, whereby it is arranged to transmit the drive power of the charging motor 52 to the second shaft member 51.

The function and operation of the second embodiment of the present invention will be explained.

In the injection process, when supplying a current to the injection motor 44, the rotor of the injection motor 44 is actuated to rotate. The rotational power of the injection motor 44 is converted to a thrust force by the ball screw 48 and the thrust force is transmitted to the first shaft member 46. The first shaft member 46 together with the injection motor mounting member 45 is forced to move forwardly to the left direction in the figure, whereby causing the screw 41 to move forwardly. Consequently, the screw 41 can inject through the nozzle 21 the molten material accumulated in front of the screw 25 into a mold cavity (not shown).

In the charging process, the charging motor 52 is started. The charging motor 52 drives the second shaft member 51, with the result that the rotation is transmitted to the second shaft member 51 through the transmitting combination of the first pulley 52, the synchronous belt drive 54, the second pulley 50. The second shaft member 51 to which the spline shaft 47 is fitted transmits the rotational power to the first shaft member 46, driving the screw 41 to proceed the charging process.

It is noted that the injection motor 44 is not driven and the rotor is kept free to rotate during the process. Whereby, the screw 41 retreats accompanying with rotation due to the pressure of the molten material that is accumulated and charged in front of the screw 41.

According to the injection apparatus of the second embodiment, the spline shaft 47 of the first shaft member 46 is fitted slidably into the hollow shaft portion 49 so that the displacement of the first shaft member 46 together with the injection motor mounting member 45 caused by the retreat motion of the screw 41 is absorbed into the slippage motion between the hollow shaft portion 49 and the spline shaft 47. Consequently, during the charging process, unlike the conventional injection apparatus as shown in FIG. 4 wherein the charging motor 52 and the injection motor 44 should be driven synchronously and thereby it is difficult to control the back pressure applied to the screw 41, the appropriate back pressure can be applied to the screw 41 by braking the molten material accumulated in front of the screw 41 with only the injection motor 44 alone being controlled.

In case of transmitting the power of the charging motor 52 to the second shaft member 51 by using the synchronous belt 55 and the pulleys 50, 54 in the charging process, it is possible to achieve the transmission with an appropriate reduction ratio between the pulley 50 and the pulley 54 which decreases the rotation rate of the screw 41. As a result, it is possible to decrease the motor torque and the current supplied to the meter motor 52, and to enable to use an amplifying element with smaller capacity.

Further, the respective movements in the axial direction of the screw 41 regarding to the injection carriage 43 having the barrel unit 42 mounted thereon, the injection motor mounting member 45 having the injection motor 44 mounted thereon and the charging motor mounting member 53 having the charging motor 52 mounted thereon can also be performed by means of the guide bar smoothly and highly precisely.

What is claimed is:

1. An injection apparatus for an injection molding machine having a barrel unit and a motor driven screw disposed in the barrel unit rotatably and movably in the axial direction, said apparatus comprising:

an injection carriage movably disposed on a base of the injection apparatus for mounting the barrel unit thereon;

an injection motor, having a rotor provided with a ball screw nut integrally therewith, disposed movably in the axial direction of the screw;

a first shaft member having one end portion connected to the screw and the other end portion having a straight-sided spline shaft;

a second shaft member provided with a hollow shaft portion having an interior wall portion into which the spline shaft is fitted slidably so as to permit a retreat motion of the first shaft member, and a ball screw portion engaging with the rotor of the injection motor;

a charging motor for driving the second shaft member and disposed movably in the axial direction of the screw; and a guide member having structure constructed and arranged to guide the injection carriage, injection motor and the charging motor to move in the axial direction of the screw.

2. The apparatus as defined in claim 1, wherein the injection motor and the charging motor are mounted on a injection motor mounting member and a charging motor mounting member respectively, wherein the motor mounting members are movably disposed on the base and guided by the guide member.

3. The apparatus as defined in claim 1, wherein the power of the charging motor is transmitted to the second shaft member by a transmission mechanism having a synchronous belt and pulleys for synchronous belt drive.

4. The apparatus as defined in claim 2, wherein guide member comprises a guide bar extending in the axial direction of the screw, through which the injection carriage, injection motor mounting member and the charging motor mounting member moves slidably.

* * * * *